（12） United States Patent
Passe et al.

(10) Patent No.: US 8,124,162 B2
(45) Date of Patent: Feb. 28, 2012

(54) PEA PROTEIN COMPOSITION

(75) Inventors: Damien Passe, Douai (FR); Catherine Fouache, Sailly/Labourse (FR); Philippe Fouache, legal representative, Sailly/Labourse (FR); Jean-Marc Verrin, Beuvry les Bethune (FR); Stéphanie Bureau, Essars (FR)

(73) Assignee: Roquette Freres, Lestrem (FR)

( * ) Notice: Subject to any disclaimer, the term of this patent is extended or adjusted under 35 U.S.C. 154(b) by 884 days.

(21) Appl. No.: 11/997,907

(22) PCT Filed: Jul. 25, 2006

(86) PCT No.: PCT/FR2006/001816
§ 371 (c)(1),
(2), (4) Date: Apr. 1, 2008

(87) PCT Pub. No.: WO2007/017572
PCT Pub. Date: Feb. 15, 2007

(65) Prior Publication Data
US 2008/0226810 A1    Sep. 18, 2008

(30) Foreign Application Priority Data

Aug. 5, 2005   (FR) ...................................... 05 08398

(51) Int. Cl.
*A23J 1/00*       (2006.01)

(52) U.S. Cl. .......................... 426/656; 426/507; 530/378
(58) Field of Classification Search .................. 426/656
See application file for complete search history.

(56) References Cited

U.S. PATENT DOCUMENTS

| 4,563,360 A | 1/1986 | Soucie et al. |
| 5,270,450 A * | 12/1993 | Westfall et al. ............... 530/378 |
| 5,658,714 A | 8/1997 | Westfall et al. |
| 2004/0091600 A1 | 5/2004 | Salome et al. |

FOREIGN PATENT DOCUMENTS

| DE | 214 527 A1 | 10/1984 |
| RU | 2 054 265 C1 | 2/1996 |

* cited by examiner

*Primary Examiner* — Elizabeth Gwartney
(74) *Attorney, Agent, or Firm* — Young & Thompson

(57) ABSTRACT

The invention relates to a pea protein whose protein content is equal to or greater than 60% by dry weight, preferably ranging from 60 to 95% by weight, a molecular weight distribution profile is of 1.0-1.8%, preferably of 1.5-3.0% of proteins of greater than 100 000 Da, preferably 20-55% of proteins greater than 15 000 and 100 000 Da, 15-30% of proteins of greater than 5 00 and 15 00 Da and 25-50%, preferably 25-45% of proteins greater than 5 000 Da and whose soluble protein content determined by a method for measuring the protein solubility in water ranging from 20 to 85%, preferably 25 to 65%.

17 Claims, No Drawings

PEA PROTEIN COMPOSITION

The present invention relates to a pea protein composition with a high protein content, characterized by its molecular weight distribution profile and its soluble protein content.

For the purposes of the invention, the term "high protein content" is intended to mean a protein content ranging from 60% to 95% by dry weight.

The present invention also relates to a pea protein composition, characterized by its solubility as a function of pH, its extractable fat content and its low antitryptic factor content.

The pea is the leguminous vegetable with protein-rich seeds that, since the 1970s, has been the most developed in Europe, and predominantly in France, in particular as a protein resource for animal food, but also for human food.

Pea proteins, like all proteins of leguminous plants, are constituted of three classes of proteins: globulins, albumins and "insoluble" proteins.

The soluble proteins of the pea (i.e. 85% of the total proteins) group together:
- the globulins (legumins, vicilins and convicilins), which are the main storage proteins of the plant, and
- the albumins, which consist of molecules that have a functional role in the seed (predominantly the albumins PA1 and PA2).

A minor class, representing 15% of the seed proteins, consists of the insoluble proteins. This fraction is rarely taken into account in the literature due to the difficulties encountered in analyzing.

The first class of soluble proteins are the globulins, which are soluble in saline aqueous solutions and represent from 65 to 80% of the pea proteins.

They include two major proteins (legumin and vicilin) and a third which is present in a smaller amount (convicilin).

The vicilin/legumin ratio ranges from 0.5 to 1.7, with a mean of 1.1.

The globulins contain a high amount of arginine, aspartic acid and glutamic acid.

The legumins are hexameric proteins of 360 to 410 kDa composed of 6 double-stranded subunits of 60 kDa.

The vicilins are trimeric proteins whose mass ranges from 150 to 200 kDa.

The convicilins have a tetrameric structure and their constitutive polypeptides have a mass of approximately 74 kDa. The final form of the protein has a mass of approximately 280 kDa.

The second class of soluble proteins are the albumins, which are proteins with a low molecular mass that are soluble in water.

The albumins generally represent from 20% to 356 of the extractable proteins of the cotyledon and include most of the enzymatic and metabolic proteins (approximately 100 different proteins are grouped together in this family).

The albumins are rich in sulfur-containing amino acids and in lysine.

The two predominant albumins (PA1 and PA2) of mass 8 to 10 kDa and of mass 22 to 26 kDa, represent 34% of the total albumin fraction (each approximately 17%).

Their amino acid composition is more balanced compared with the amino acids of the globulins, hence the fact that the albumins have a better nutritional quality.

The other biologically active proteins classified among the albumins are: lipoxygenases (catalysts of alkene and in particular fatty acid oxidation), lectins (due to their ability to agglutinate carbohydrate molecules) and protease inhibitors.

In the pea, the most abundant protease inhibitors are the serine protease inhibitors, and more particularly the tryptic inhibitors. They are proteins of low molecular mass (approximately 16 kDa), rich in cysteine that is involved in many disulfide bridges.

These inhibitors are proteins or polypeptides which bind specifically and stably to proteolytic enzymes and prevent them from functioning. They therefore reduce the nutritional value of foods.

The quality of the pea protein compositions, sought after for their applications in human and animal foods, is based on the functional properties of the proteins constituting said compositions taken individually.

These functional properties are their ability to bind to water and to bind to fats, their foaming, dispersing, gelling and emulsifying capacity, their solubility and their thermostability.

Depending on the type of proteins, the properties of the resulting protein compositions are different and change essentially according to certain parameters, such as, for example, the ambient temperature or the pH.

It thus appears in the literature that, depending on the required techniques, the properties of the protein compositions should be selectively adjusted by the choice of entirely specific manufacturing parameters.

These manufacturing parameters then promote the presence of some constitutive proteins or other of the pea (for example, albumins or globulins) in the protein compositions under consideration.

It is deduced from the above that the use of the pea protein compositions in food applications for humans and animals depends on their method of preparation.

These methods of preparation conventionally result in the production of "pea protein concentrates" or of "pea protein isolates", when the extraction process does not stop at the preparation of only the flour (cf. the review by J. Gueguen of 1983 in *Proceedings of European congress on plant proteins for human food* (3-4) pp. 267-304).

The pea protein concentrates and isolates are defined in the review by J. Geuguen from the point of view of their protein content:
- the pea protein concentrates are described as having a total protein content of 60% to 75% on a dry weight basis, and
- the pea protein isolates are described as having a total protein content of 90% to 95% on a dry weight basis, the % being expressed as content of nitrogen N×6.25 (cf. the review by M. Soral-Smietana et al. in *Polish Journal of food and nutrition Sciences*, 1998, vol. 7/48 No. 2, pp. 193-200).

Two processes are conventionally used for extracting pea protein isolates and concentrates: the wet process and the dry process.

The use of the wet process (by alkaline extraction and acid precipitation or ultrafiltration) for extracting pea proteins is recommended by specialists in the field only for obtaining protein isolates.

In fact, the small amount of soluble carbohydrates does not allow the use of the wet process for obtaining pea protein concentrates.

These processes for obtaining pea protein isolates are often preferred since they produce compositions containing fewer antinutritional factors.

The use of the dry process, i.e. air classification processes, makes it possible to obtain pea protein concentrates.

It is not therefore possible to have a single process which makes it possible to custom-produce both pea protein isolates and pea protein concentrates.

Protein compositions are then obtained which behave differently, in particular in terms of their water-solubility as a function of pH.

In fact, the water-solubility profile of the pea protein isolates and concentrates (albumins like globulins) is dependent on the pH of the aqueous solution, given the values of their respective isoelectric pHs (or pHis).

For example, pea protein isolates conventionally exhibit excellent solubility at alkaline pH and in very acidic pH ranges, of from 2 to 3.

The lowest solubility is obtained in pH regions close to the isoelectric pH of the proteins constituting the isolates, i.e. pH regions ranging from 4 to 6.

Pea protein isolates exhibit, moreover, good foaming properties, but must be concentrated so as to be more viscous.

The quality of the prior-art pea protein compositions is therefore directly dependent on the operating conditions used to prepare them.

Within the same method of preparation, in the case in point the wet process, the choice of an acidic, alkaline or neutral extraction process will also directly influence the foaming or emulsifying properties of the protein compositions obtained.

Such protein compositions cannot therefore be used as they are in any fields of application.

It may therefore be necessary to modify the protein compositions obtained so as to confer the desired properties on them, using, for example, complex techniques such as enzymatic hydrolysis.

For example, for the key aspect of the water-solubility of the protein compositions, it may be preferable to use pea protein hydrolysates rather than the pea proteins themselves, despite all the foreseeable consequences in terms of the quality of the final product that this will bring about.

From all the above, it can be seen that there exists an unmet need for a pea protein composition with a high protein content which, by virtue of its protein profile, exhibits notable functional properties, such as its water-solubility, but also its ability to bind to water and to bind to fats, and its foaming, dispersing, gelling and emulsifying capacity.

The applicant company has, to its credit, reconciled all these objectives reputed up until now to be difficult to reconcile, by proposing a pea protein composition, characterized in that it has:
- a protein content of at least 60% by weight, preferably ranging from 60% to 95% by weight, on a dry weight basis,
- a molecular weight distribution profile which is constituted of:
  - from 1% to 8%, preferably from 1.5% to 3% of proteins of more than 100 000 Da,
  - from 20% to 55%, preferably from 25% to 55% of proteins of more than 15 000 and of no more than 100 000 Da,
  - from 15% to 30% of proteins of more than 5000 and of no more than 15 000 Da,
  - and from 25% to 50%, preferably from 25% to 45% of proteins of no more than 5000 Da,
- a soluble protein content, expressed according to a test for measuring the water-solubility of proteins, ranging from 20% to 85%, preferably ranging from 20% to 65%.

Surprisingly and unexpectedly, the pea protein composition according to the invention has a protein content ranging from 60% to 95% by weight on a dry weight basis, which allows the custom provision of pea protein isolates or concentrates.

The determination of the protein content of said protein composition in accordance with the invention is carried out by the method of determining the nitrogen according to the Dumas method in samples in which the presumed nitrogen content is greater than 0.030% (weight/weight), according to standard NF V 18-120-March 1997.

The nitrogen content or protein content (N×6.25) is expressed in grams per 100 grams of dry product.

By way of example, the pea protein compositions sold by the companies Cosucra S.A. (Momalle—Belgium) or Parrheim (Canada) are sold only in the form of isolates, under the respective trademarks Pisane® and Propulse™.

Pisane® and Propulse™ thus have a total protein content of up to 85%.

The pea protein composition according to the invention has a molecular weight distribution profile which is constituted of:
- from 1% to 8%, preferably from 1.5% to 3% of proteins of more than 100 000 Da,
- from 20% to 55%, preferably from 25% to 55% of proteins of more than 15 000 and of no more than 100 000 Da,
- from 15% to 30% of proteins of more than 5000 and of no more than 15 000 Da,
- and from 25% to 50%, preferably from 25% to 45% of proteins of no more than 5000 Da.

The determination of the molecular weights of the proteins constituting said composition is carried out by size exclusion chromatography; the separation is carried out according to the size of the molecules to be separated, the molecules of large size being eluted first.

The separation is carried out on Superdex 200 HR 10/30 and Superdex Peptide HR 10/30 columns from Pharmacia Biotech, placed in series, and equipped with a 486 UV detector at 214 nm.

The flow rate is adjusted to 0.3 ml/min and the separation is carried out at ambient temperature.

An injection of 100 µl at 0.5 brix is carried out, and the proteins are eluted with 0.05M NaCl (2.92 g/l) in HPLC-quality water.

The sample to be injected onto the column is prepared as follows: exactly 0.1 g of the sample is weighed out into a 50-ml beaker, 20 ml of water are added, and the mixture is left to stir using a magnetic bar on a magnetic stirrer at 200 rpm for 1 hour. The resulting mixture is then filtered through 0.45 µm and the brix is adjusted to 0.5.

The column is calibrated with a control mixture sold by Biorad under the reference 151-1901, composed of compounds of known molecular weight, i.e. thyroglobulin (670 000 Da), bovine albumin (158 000 Da), ovalbumin (44 000 Da), myoglobulin (17 000 Da) and vitamin B12 (1350 Da).

The curve of log (MW) as a function of retention time is plotted and said retention time of the protein compounds with a molecular weight of more than 100 000 Da, of more than 15 000 and of no more than 100 000 Da, of more than 5000 and of no more than 15 000 Da, and of no more than 5000 Da is determined.

The integration of the peaks is begun at the retention times found and a quantitative determination by surface distribution is carried out.

The results are given as surface percentage. The chromatogram surface distribution is representative of the composition of the protein fraction solubilized in the water.

The percentage of proteins on a dry weight basis of a peak of the chromatogram is given by the following expression:

$$\%/\text{dry weight of a peak} = \frac{SP}{ST}$$

where SP represents the surface of the peak and ST represents the total surface of the chromatogram.

As will be exemplified hereinafter, the pea protein composition has a molecular weight distribution profile that is entirely unique, quite different from that of the commercially available pea protein isolates, in particular those of Pisane® and of Propulse™.

This protein composition has a soluble protein content, expressed according to a test for measuring the water-solubility of proteins, ranging from 20% to 85%, preferably ranging from 20% to 65%.

This test for measuring the water-solubility of proteins consists in determining the content of soluble materials in the water without adjusting the pH, by a method of dispersion of a test specimen of the sample in distilled water, centrifugation and analysis of the supernatant.

200.0 g of distilled water are introduced into a 400-ml beaker at 20° C.±2° C., and magnetically stirred (magnetic bar and rotation at 200 rpm). Exactly 5 g of the sample to be analyzed are added.

The mixture is stirred for 30 min, and the resulting product is centrifuged for 15 minutes at 4000 rpm. The method for determining the nitrogen according to the abovementioned Dumas method is carried out on the supernatant.

The nitrogen content or protein content (N×6.25) is expressed in grams per 100 grams of dry product. The protein composition according to the invention thus has a soluble protein content, on a dry weight basis, which advantageously ranges from 20% to 859%, preferably from 20% to 65%.

The protein composition according to the invention can also be characterized by its aqueous solubility as a function of pH, and more particularly at a pH value close to the pHi of the majority of the pea proteins, i.e. pH value ranging from 4 to 6.

The protein composition according to the invention is thus characterized in that its aqueous solubility, determined according to a test for measuring the water-solubility of proteins:
  ranges from 10% to 20% at pH 4,
  ranges from 15% to 50%, preferably from 20% to 45% at pH 6.

The solubility measurement is carried out under the same conditions as those of the test for measuring the water-solubility of proteins, except for the fact that the 200 g of distilled water which are added with stirring to the 5 g of sample to be analyzed are adjusted to a pH of 4 or to a pH of 6, as appropriate.

It is generally accepted that pea proteins have a relatively low solubility in the pH range around their pHi.

This remains true for the protein composition according to the invention, except for the fact that, as will be exemplified hereinafter, the solubility is equal to, or at best 1.5 times greater, at pH 4, and is better at pH 6 (up to twice as soluble) than the Pisane® or Propulse™ pea protein isolates.

The protein composition according to the invention is also characterized by its extractable fat content.

This extractable fat content is determined according to the method A of the 2nd EEC guideline amended by that of Dec. 20, 1983, published in the ECOJ on Jan. 18, 1984,—reiterated in NF V18-117 of August 1997 "category A samples".

The principle of this method is based on hexane extraction of the lipids of a sample of 25 g in a Soxhlet extractor (the reflux flow rate should be adjusted so as to obtain 10 cycles per hour), elimination of the solvent and weighing of the residue thus obtained.

The extractable lipid content is expressed as percentage by weight of the residue relative to the 25 g of sample analyzed.

The protein composition according to the invention then has an extractable fat content ranging from 0.3% to 5%, preferably ranging from 0.3% to 3%, more preferably ranging from 0.3% to 1.5% by weight.

This low extractable fat content is a reflection of the degree of purity of said protein composition.

As regards to the presence of antitryptic factors, evidence of the nutritional quality of the protein composition in accordance with the invention, it is determined as ranging from 2 to 5.5 TIU/mg.

The determination of antitryptic factors consists in extracting, with sodium hydroxide, the trypsin inhibitors. Increasing volumes of the diluted sample are then brought into contact with an excess of trypsin in the presence of N-alpha-benzoyl-DL-arginine-p-nitroanilide (BAPNA), which will then be hydrolyzed in the form of p-nitroaniline, a compound which absorbs at 410 nm. After blocking of the reaction with acetic acid, the increase in coloration is measured on a spectrophotometer at 410 nm.

The content of inhibitors is then calculated from the rate of decrease of the coloration.

A trypsin unit is arbitrarily defined as the amount of enzyme required to bring about an increase of 0.01 unit of absorbance at 410 nm per 10 ml of reaction mixture under the conditions of the AOCS Ba 12-75 method.

According to the studies by Kakade et al., 1969, 1 μg of pure trypsin has an activity of 1.9 TU (tryptic activity unit), i.e. an absorbance of 0.019 unit.

To the applicant company's knowledge, the functional properties of the pea protein composition in accordance with the invention, in terms equally of its molecular weight distribution profile, its water-solubility (in particular at pH 4 and pH 6), its extractable fat content or its antitryptic factor content, have never been obtained for a conventional pea protein composition.

A first group of products in accordance with the invention is constituted by pea protein compositions which preferably have a molecular weight distribution profile which is constituted of:
  from 20% to 40%, preferably from 25% to 35% of proteins of more than 15 000 and of no more than 100 000 Da,
  from 15% to 30%, preferably from 20% to 30% of proteins of more than 5000 and of no more than 15 000 Da,
  and from 40% to 50%, preferably from 40% to 45% of proteins of no more than 5000 Da,
  a soluble protein content, determined according to a test for measuring the water-solubility of proteins, ranging from 40% to 85%, preferably ranging from 60% to 65%.

Moreover, this composition is characterized in that its aqueous solubility:
  ranges from 10% to 15%, preferably from 10% to 13.5% at pH 4,
  ranges from 25% to 50%, preferably from 40% to 45% at pH 6.

A second group of products in accordance with the invention is constituted by pea protein compositions which preferably have a molecular weight distribution profile which is constituted of:
  from 40% to 55%, preferably from 50% to 55% of proteins of more than 15 000 and of no more than 100 000 Da,
  from 15% to 30%, preferably from 15% to 20% of proteins of more than 5000 and of no more than 15 000 Da,
  and from 25% to 40%, preferably from 25% to 30% of proteins of no more than 5000 Da,
  a soluble protein content, determined according to a test for measuring the water-solubility of the total proteins, ranging from 20% to 55%.

Moreover, this composition is characterized in that its aqueous solubility:
ranges from 10% to 20% at pH 4,
ranges from 15% to 35%, preferably from 20% to 35% at pH 6.

The protein composition in accordance with the invention can be obtained by carrying out the following steps.

The extraction of the pea flour components can be carried out by any means, and in particular according to the method described in patent application EP 1 400 537, of which the applicant company is the proprietor.

More particularly, this method consists of the succession of the following steps:
preparing a flour by grinding dry peas previously cleaned, sorted, blanched and dusted,
suspending the pea flour in water,
fractionating said suspension so as to isolate a protein-rich fraction,
isolating the protein component of said fraction by a thermal flocculation technique at the isoelectric pH of said proteins and at a temperature ranging from 40 to 70° C. for from 5 to 30 minutes, preferably from 10 to 30 minutes,
centrifuging the precipitated mixture using a centrifugal decanter or a plate separator so as to recover the soluble proteins in the precipitate,
diluting the precipitate in water so as to obtain a solids content ranging from 5% to 15%,
correcting the pH of the solution to a value ranging from 7 to 7.5,
optionally, thermally treating said precipitate resuspended in water at a temperature of from 75 to 95° C. for from 10 minutes to 1 hour,
recovering and drying the protein composition thus obtained.

In a first step of the method in accordance with the invention, the flour obtained from peas previously cleaned, sorted, blanched, dusted and ground is suspended in water.

The pH of the solution is not a limiting factor, but it is chosen not to correct the pH of the suspension, which means working in a pH range of from 6.2 to 7.

Advantageously, the applicant company recommends placing the flour in water at a temperature ranging from 5 to 20° C., preferably of the order of 15° C., more preferably at a temperature of 5° C., cooled so as to limit the development of unwanted bacteria.

Although it is not essential, it may be chosen to leave the suspension to diffuse in this aqueous medium for a short period of time ranging from 5 min to 2 hours, at this temperature.

In a second step of the method in accordance with the invention, it is chosen to fractionate said flour-in-water suspension by any means known, moreover, to those skilled in the art, so as to isolate a protein-rich fraction.

Equipment selected from the group consisting of hydrocyclones and centrifugal decanters may then be used.

In a first preferred embodiment, the fractionation of the flour-in-water suspension consists in fractionating said suspension on centrifugal decanters so as to isolate a fraction rich in proteins and soluble materials from a fraction constituted of the mixture of starch and internal fibers.

In a second preferred embodiment, the fractionation of the flour-in-water suspension consists in fractionating said suspension on hydrocyclones so as to isolate a fraction rich in starch from a fraction constituted of the mixture of proteins, internal fibers and soluble materials, and then in treating the fraction constituted of the mixture of proteins, internal fibers and soluble materials on centrifugal decanters so as to separate a fraction rich in internal fibers from a fraction rich in proteins and soluble materials.

In a third step of the method in accordance with the invention, the proteins of the fraction containing the mixture of proteins and soluble materials thus obtained (whether by the first or the second preferred embodiment) are isolated by a technique selected from the group of techniques for precipitating proteins at their isoelectric pH and ultrafiltration-type membrane separation techniques.

It is advantageously chosen to carry out the thermal flocculation of the proteins by adjusting the protein-rich fraction to a pH value corresponding to the isoelectric point (pI) of said proteins, i.e. to a pH value of the order of 4.5.

The flocculation of said proteins is then carried out at a temperature ranging from 40 to 70° C. for from 5 to 30 minutes, preferably from 10 to 30 minutes.

This flocculation time/temperature diagram thus makes it possible to obtain a protein recovery yield ranging from 65% to 85% of extracted proteins/total proteins.

The separation of the precipitate (also referred to as "floc") containing the soluble proteins is carried out on a centrifugal decanter or in a plate separator.

The floc is then diluted to a solids content ranging from 5% to 15% so as to allow it to be conveyed to the spray installations so as to be dried and conditioned.

The pH is corrected so as to obtain a value ranging from 7 to 7.5.

This spraying is carried out under conventional conditions well known to those skilled in the art.

In order to dry the product, it is advantageously chosen to carry out a spraying on a single-effect tower with a compressed air nozzle, under the following conditions:
drying air temperature: 130 to 180° C.
mist temperature: 80 to 90° C.
evaporation capacity: 15 to 25 l/h
pressure: 0.5 to 2 bar.

The treatment of thermal flocculation of the fraction rich in proteins and soluble materials and then of spray-drying makes it possible to obtain a protein composition in accordance with the invention which has a molecular weight distribution profile which is constituted of:
from 20% to 40%, preferably from 25% to 35% of proteins of more than 15 000 and of no more than 100 000 Da,
from 15% to 30%, preferably from 20% to 30% of proteins of more than 5000 and of no more than 15 000 Da,
and from 40% to 50%, preferably from 40% to 45% of proteins of no more than 5000 Da,
a soluble protein content, determined according to a test for measuring the water-solubility of proteins, ranging from 40% to 85%, preferably ranging from 60% to 65%.

Moreover, this composition is characterized in that its aqueous solubility:
ranges from 10% to 15%, preferably ranges from 10% to 13.5% at pH 4,
ranges from 25% to 50%, preferably ranges from 40% to 45% at pH 6.

An additional thermal treatment may be carried out before the spray-drying step, after the step of thermal flocculation, dilution and then correction of the pH of the floc obtained, said treatment being carried out at a temperature ranging from 75 to 95° C. for from 10 minutes to 1 hour.

This thermal treatment leads to the production of a protein composition in accordance with the invention which has a molecular weight distribution profile which is constituted of:
from 40% to 55%, preferably from 50% to 55% of proteins of more than 15 000 and of no more than 100 000 Da, from 15% to 30%, preferably from 15% to 20% of proteins of more than 5000 and of no more than 15 000 Da,
and from 25% to 40%, preferably from 25% to 30% of proteins of no more than 5000 Da,
a soluble protein content, determined according to a test for measuring the water-solubility of the total proteins, ranging from 20% to 55%.

Moreover, this composition is characterized in that its aqueous solubility:
ranges from 10% to 20% at pH 4,
ranges from 15% to 35%, preferably ranges from 20% to 35% at pH 6.

While this second thermal treatment makes it possible to significantly increase the viscosity of the protein composition thus obtained, it generally results in a decrease in the antitryptic activity of said composition, while at the same time slightly reducing its water-solubility, as will be exemplified hereinafter.

The pea protein composition thus obtained has notable water-solubility properties, but also excellent water-retention and emulsifying and gelling capacity properties.

This means that they are suitable for the purpose of applications in fermentation, in animal nutrition and especially in food applications:
in drinks and milk products,
in mixtures of powders intended for diet products, or for sports people,
in soups and sauces,
in meat-based products, more particularly in the fine pasta and brine sectors,
in fish-based products, such as surimi-based products,
in cereal products, such as bread, pasta, biscuits, pastries, cereals and bars,
in vegetarian products and ready meals.

The pea protein composition according to the invention which has a molecular weight distribution profile which is constituted of:
from 20% to 40%, preferably from 25% to 35% of proteins of more than 15 000 and of no more than 100 000 Da,
from 15% to 30%, preferably from 20% to 30% of proteins of more than 5000 and of no more than 15 000 Da,
and from 40% to 50%, preferably from 40% to 45% of proteins of no more than 5000 Da,
a soluble protein content, determined according to a test for measuring the water-solubility of proteins, ranging from 40% to 85%, preferably ranging from 60% to 65%,
and, moreover, an aqueous solubility:
ranging from 10% to 15%, preferably ranging from 10% to 13.5% at pH 4,
ranging from 20% to 50%, preferably ranging from 40% to 45% at pH 6,
can advantageously be used in the brine sector, in particular in the production of hams.

It may also be used in drink and milk product applications.

As regards the pea protein composition according to the invention, which has a molecular weight distribution profile which is constituted of:
from 40% to 55%, preferably from 50% to 55% of proteins of more than 15 000 and of no more than 100 000 Da,
from 15% to 30%, preferably from 15% to 20% of proteins of more than 5000 and of no more than 15 000 Da,
and from 25% to 40%, preferably from 25% to 30% of proteins of no more than 5000 Da,
and a soluble protein content, determined according to a test for measuring the water-solubility of the total proteins, ranging from 20% to 55%, and, moreover, an aqueous solubility:
ranging from 10% to 20% at pH 4,
ranging from 15% to 35%, preferably ranging from 20% to 35% at pH 6,
it may advantageously be used in the fine pasta sector.

Other characteristics and advantages of the invention will emerge on reading the nonlimiting examples described below.

EXAMPLE 1

Three batches of a pea protein composition in accordance with the invention are prepared in the following way:

Pea flour is prepared by grinding shelled fodder peas on an Alpine hammer mill equipped with a 100-µm screen.

300 kg of flour containing 87% solids are then soaked in water at the final concentration of 25% on a dry weight basis, at a pH of 6.5.

1044 kg of flour suspension containing 25% of solids (i.e., therefore, 261 kg of dry flour) are then introduced with 500 kg of water into a battery of 14-stage hydrocyclones, fed with the flour suspension at stage no. 5.

This separation results in the production of a light phase which corresponds to the outlet of stage no. 1.

It is constituted of the mixture of proteins, internal fibers and soluble materials.

This light phase at the hydrocyclone outlet contains, as a mixture (142 kg on a dry weight basis in total): the fibers (approximately 14.8% by weight, i.e. 21 kg dry weight), the proteins (approximately 42.8% by weight, i.e. 60.8 kg dry weight) and the soluble materials (approximately 42.4% by weight, i.e. 60.2 kg dry weight). This fraction has a solids content of 10%.

The separation of the fibers is carried out on Wesphalia centrifugal decanters.

The light phase at the centrifugal decanter outlet contains a mixture of proteins and of soluble materials, while the heavy phase contains the pea fibers.

The heavy phase contains 105 kg of fibers containing 20% of solids.

It is noted that virtually all the fibers are indeed found in this fraction. As regards the protein and soluble materials fraction, it contains 1142 kg of a mixture in solution of soluble materials and of proteins (fraction containing 6% of solids).

The proteins are flocculated at their isoelectric point by adjusting the light phase at the centrifugal decanter outlet to a pH of 4.5 and heating to 60° C. by passing through a nozzle. The proteins thus flocculated are left in a maturing tank for 10 minutes.

The soluble materials/proteins separation is then carried out on a centrifugal decanter. The mixture obtained at the maturing tank outlet then feeds the centrifugal decanter at a flow rate of 0.5 m$^3$/h.

The heavy phase, or "floc", which has a solids content of 35%, is diluted to 10% by adding water. The pH of the floc of 4.5 is corrected to a value of 7.5 by adding sodium hydroxide.

Finally, spraying is carried out on a single-effect tower with a compressed air nozzle in order to dry the product, under the following conditions:
drying air temperature: 150° C.
mist temperature: 85° C.
evaporation capacity: 20 l/h
pressure: 1 bar.

All these operations make it possible to obtain a first protein composition in accordance with the invention.

The three batches prepared according to the above method have the characteristics given in table I below.

TABLE I

|  | Protein composition I Batch 1 | Protein composition I Batch 2 | Protein composition I Batch 3 |
|---|---|---|---|
| Total protein content (% N × 6.25) on a dry weight basis | 86.2 | 82.6 | 84.0 |
| Soluble protein content (% N × 6.25) on a dry weight basis | 67.8 | 58.5 | 49.0 |
| Molecular weight profile (relative %) | | | |
| >100 000 Da | 3 | 2 | 7 |
| 15 000 and <100 000 Da | 25 | 23 | 31 |
| >5000 and <15 000 Da | 25 | 29 | 21 |
| <5000 Da | 47 | 46 | 41 |
| Aqueous solubility at pH 4 (% N × 6.25) on a dry weight basis | 14.0 | 13.3 | 11.5 |
| Aqueous solubility at pH 6 (% N × 6.25) on a dry weight basis | 45.6 | 36.9 | 28.1 |
| Extractable fats (%) on a dry weight basis | 1.3 | 1.5 | 2.8 |
| Antitryptic activities (TIU/mg) on a dry weight basis | 3.0 | 3.7 | 4.2 |

These protein compositions, which belong to the first group of protein compositions in accordance with the invention, have a total protein richness of greater than 80%, more than 40%, or even more than 60%, of which are water-soluble.

It is possible to carry out, on the floc obtained in the step of the method described above, a heat treatment at 85° C. for 10 minutes on a heat exchanger with a rough surface, followed by spraying according to the protocol given above.

All these operations make it possible to obtain a second protein composition in accordance with the invention.

The three new batches prepared according to these additional operations have the characteristics given in table II below.

TABLE II

|  | Protein composition II Batch 1 | Protein composition II Batch 2 | Protein composition II Batch 3 |
|---|---|---|---|
| Total protein content (% N × 6.25) on a dry weight basis | 85.2 | 85.1 | 86.8 |
| Soluble protein content (% N × 6.25) on a dry weight basis | 25.8 | 32.8 | 46.6 |
| Molecular weight profile (relative %) | | | |
| >100 000 Da | 2 | 2 | 5 |
| 15 000 and <100 000 Da | 45 | 48 | 45 |
| >5000 and <15 000 Da | 23 | 20 | 17 |
| <5000 Da | 30 | 30 | 32 |
| Aqueous solubility at pH 4 (% N × 6.25) on a dry weight basis | 16.1 | 13.1 | 12.7 |
| Aqueous solubility at pH 6 (% N × 6.25) on a dry weight basis | 23.6 | 18.8 | 19.2 |
| Extractable fats (%) on a dry weight basis | 1.2 | 0.6 | 2.8 |
| Antitryptic activities (TIU/mg) on a dry weight basis | 2.8 | 3.7 | 3.5 |

These protein compositions, which belong to the second group of protein compositions in accordance with the invention, have a total protein richness of greater than 70%, more than 25%, or even close to 50', of which are water-soluble.

The second heat treatment makes it possible to slightly reduce the amount of antitryptic factors and results in a protein composition with a lower solubility at pH 6 (whereas the solubility at a pH value close to the pHi remains of the same order of magnitude).

EXAMPLE 2

The protein compositions in accordance with the invention prepared by applying the method described in example 1 are compared, in table III below, with protein compositions that are otherwise known.

TABLE III

| | PISANE ® HD COSUCRA Batch 1 | PISANE ® HD COSUCRA Batch 2 | PISANE ® HD COSUCRA Batch 3 | PROPULSE ™ PARRHEIM | Protein composition I Batches 1, 2 and 3 | | | Protein composition II Batches 1, 2 and 3 | | |
|---|---|---|---|---|---|---|---|---|---|---|
| Total protein content (% N × 6.25) on a dry weight basis | 88.4 | 88.1 | 87.7 | 84.5 | 86.2 | 82.6 | 84.0 | 85.2 | 85.1 | 86.8 |
| Soluble protein content (% N × 6.25) on a dry weight basis | 17.4 | 8.9 | 19.7 | 16.6 | 67.8 | 58.5 | 49.0 | 25.8 | 32.8 | 46.6 |
| Molecular weight profile (relative %): | | | | | | | | | | |
| ≧100 000 Da | 4 | 2 | 6 | 4 | 3 | 2 | 7 | 2 | 2 | 5 |
| ≧15 000 and <100 000 Da | 53 | 60 | 53 | 54 | 25 | 23 | 31 | 45 | 48 | 45 |
| ≧5000 and <15 000 Da | 21 | 11 | 21 | 20 | 25 | 29 | 21 | 23 | 20 | 17 |
| <5000 Da | 22 | 27 | 19 | 22 | 47 | 46 | 41 | 30 | 30 | 32 |
| Aqueous solubility at pH 4 (% N × 6.25) on a dry weight basis | 6.6 | 8.3 | 9.5 | 17.3 | 14.0 | 13.3 | 11.5 | 16.1 | 13.1 | 12.7 |
| Aqueous solubility at pH 6 (% N × 6.25) on a dry weight basis | 15.5 | 10.6 | 15.0 | 22.0 | 45.6 | 36.9 | 28.1 | 23.6 | 18.8 | 19.2 |
| Extractable fats (%) on a dry weight basis | 1.2 | 1.1 | 1.3 | 1.9 | 1.3 | 1.5 | 2.8 | 1.2 | 0.6 | 2.8 |
| Antitryptic activities (TIU/mg) on a dry weight basis | 3.7 | 2.6 | 3.8 | 4.9 | 3.0 | 3.7 | 4.2 | 2.8 | 3.7 | 3.5 |

The protein compositions in accordance with the invention have an entirely specific molecular weight distribution profile, which is different for the two groups, compared with the commercial protein compositions.

The first group in accordance with the invention is characterized by a trimodal spectrum wherein more than 40% of the proteins have a weight of no more than 5000 Da, and wherein the proteins of molecular weight of more than 5000 and of no more than 15 000 Da and those of molecular weight of more than 15 000 and of no more than 100 000 Da are in proportions ranging from 21% to 31%.

None of the known protein compositions have such a profile.

The second group in accordance with the invention also has a trimodal spectrum, wherein this time more than 45% of the proteins have a molecular weight of more than 15 000 and of no more than 100 000 Da, the rest of the proteins being distributed in ranges, firstly, of more than 5000 and of no more than 15 000 Da and, secondly, of no more than 5000 Da.

This molecular weight distribution profile is more typical of the commercial pea protein compositions, but none of them has such a solubility.

The extractable fat content and the antitryptic factor content make the compositions in accordance with the invention perfectly suitable for applications in human and animal nutrition.

The invention claimed is:

1. A pea protein composition, characterized in that it has:
   a protein content of at least 60% by weight on a dry weight basis,
   a molecular weight distribution profile which is constituted of:
   i. from 1% to 8% of proteins of more than 100 000 Da,
   ii. from 20% to 55% of proteins of more than 15 000 and of no more than 100 000 Da,
   iii. from 15% to 30% of proteins of more than 5000 and of no more than 15 000 Da,
   iv. From 25% to 50% of proteins of no more than 5000 Da; and
   a soluble protein content, expressed according to a test for measuring the water-solubility of proteins, ranging from 20% to 85%.

2. The composition as claimed in claim 1, characterized in that its aqueous solubility:
   ranges from 10% to 20% at pH 4,
   ranges from 15% to 50% at pH 6.

3. The composition as claimed in claim 1, characterized in that its extractable fat content ranges from 0.3% to 5%.

4. The composition as claimed in claim 1, characterized in that its antitryptic factor content ranges from 2 to 5.5 TIU/mg.

5. The composition as claimed in claim 1, characterized in that it has a molecular weight distribution profile which is constituted of:
   i. from 20% to 40% of proteins of more than 15 000 and of no more than 100 000 Da,
   ii. from 15% to 30% of proteins of more than 5000 and of no more than 15 000 Da; and
   iii. From 40% to 50% of proteins of no more than 5000 Da; and
   a soluble protein content, determined according to a test for measuring the water-solubility of proteins, range from 40% to 85%.

6. The composition as claimed in claim 5, characterized in that its aqueous solubility:
   ranges from 10% to 15% at pH 4,
   ranges from 25% to 50% at pH 6.

7. The composition as claimed in claim 1, characterized in that it has a molecular weight distribution profile which is constituted of:
   i. from 40% to 55% of proteins of more than 15 000 and of no more than 100 000 Da,
   ii. from 15% to 30% of proteins of more than 5000 and of no more than 15 000 Da; and
   iii. From 25% to 40% of proteins of no more than 5000 Da; and
   a soluble protein content, determined according to a test for measuring the water-solubility of proteins, range from 20% to 55%.

8. The composition as claimed in claim 7, characterized in that its aqueous solubility:
ranges from 10% to 20% at pH 4,
ranges from 15% to 35 at pH 6.

9. The composition as claimed in claim 2, characterized in that its extractable fat content ranges from 0.3% to 5%.

10. The composition as claimed in claim 2, characterized in that its antityptic factor content ranges from 2 to 5.5 TIU/mg.

11. The composition as claimed in claim 3, characterized in that its antityptic factor content ranges from 2 to 5.5 TIU/mg.

12. A method for producing the pea protein composition as claimed in claim 1, characterized in that it consists of the succession of the following steps:
preparing a flour by grinding dry peas previously cleaned, sorted, blanched and dusted,
suspending the pea flour in water,
fractionating said suspension so as to isolate a fraction rich in proteins and in soluble materials,
isolating the protein component of said fraction by a thermal flocculation technique at the isoelectric pH of said proteins and at a temperature ranging from 40 to 70° C. for from 5 to 30 minutes,
centrifuging the precipitated mixture using a centrifugal decanter or a plate separator so as to recover the soluble proteins in the precipitate,
diluting the precipitate in water so as to obtain a solids content ranging from 5% to 15%,
correcting the pH of the solution to a value ranging from 7 to 7.5,
optionally, thermally treating said precipitate resuspended in water at a temperature of from 75 to 95° C. for from 10 minutes to 1 hour,
recovering and drying the protein composition thus obtained.

13. The method as claimed in claim 12, characterized in that the step of fractionation of the pea flour-in-water suspension is carried out using equipment selected from the group consisting of hydrocyclones and centrifugal decanters.

14. The method as claimed in claim 13, characterized in that the fraction rich in proteins and soluble material is obtained by the steps consisting of:
fractionating the flour-in-water suspension on centrifugal decanters so as to isolate a fraction rich in proteins and soluble materials from a fraction constituted of the mixture of starch and internal fibers,
recovering the fraction rich in proteins and soluble materials in the supernatant of the centrifugal decanters.

15. The method as claimed in claim 13, characterized in that the fraction rich in proteins and soluble material is obtained by the steps consisting of:
fractionating the flour-in-water suspension on hydrocyclones so as to isolate a fraction rich in starch from a fraction constituted of the mixture of proteins, internal fibers and soluble materials,
treating the fraction constituted of the mixture of proteins, internal fibers and soluble materials on centrifugal decanters so as to separate a fraction rich in internal fibers from a fraction rich in proteins and soluble materials,
recovering the fraction rich in proteins and soluble materials in the supernatant of the centrifugal decanters.

16. A method for producing the pea protein composition as claimed in claim 5, characterized in that it consists of the succession of the following steps:
preparing a flour by grinding dry peas previously cleaned, sorted, blanched and dusted,
suspending the pea flour in water,
fractionating said suspension so as to isolate a fraction rich in proteins and in soluble materials,
isolating the protein component of said fraction rich in proteins and in soluble materials by a thermal flocculation technique at the isoelectric pH of said proteins and at a temperature of 60° C. for 10 minutes,
diluting the precipitate in water so as to obtain a solids content ranging from 5% to 15%,
correcting the pH of the solution to a value ranging from 7 to 7.5,
recovering and, optionally, drying the protein composition thus obtained.

17. A method for producing the pea protein composition as claimed in claim 7, characterized in that it consists of the succession of the following steps:
preparing a flour by grinding dry peas previously cleaned, sorted, blanched and dusted,
suspending the pea flour in water,
fractionating said suspension so as to isolate a fraction rich in proteins and in soluble materials,
isolating the protein component of said fraction rich in proteins and in soluble materials by a thermal flocculation technique at the isoelectric pH of said proteins and at a temperature of 60° C. for 10 minutes,
centrifuging the precipitated mixture using a centrifugal decanter so as to recover the soluble proteins in the precipitate,
diluting the precipitate in water so as to obtain a solids content ranging from 5% to 15%,
correcting the pH of the solution to a value ranging from 7 to 7.5,
thermally treating said precipitate resuspended in water at a temperature of 85° C. for 10 minutes,
recovering and drying the protein composition thus obtained.

* * * * *